United States Patent
Malakhov et al.

(10) Patent No.: US 9,262,230 B2
(45) Date of Patent: Feb. 16, 2016

(54) METHOD AND SYSTEM FOR WORK PARTITIONING BETWEEN PROCESSORS WITH WORK DEMAND FEEDBACK

(75) Inventors: Anton Malakhov, Nizhny Novgorod (RU); Alexey Kukanov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 13/991,373

(22) PCT Filed: Aug. 5, 2011

(86) PCT No.: PCT/IB2011/001823
§ 371 (c)(1),
(2), (4) Date: Jul. 10, 2014

(87) PCT Pub. No.: WO2013/021223
PCT Pub. Date: Feb. 14, 2013

(65) Prior Publication Data
US 2015/0026698 A1    Jan. 22, 2015

(51) Int. Cl.
*G06F 9/46* (2006.01)
*G06F 9/50* (2006.01)

(52) U.S. Cl.
CPC ............ *G06F 9/5077* (2013.01); *G06F 9/5066* (2013.01); *G06F 9/5088* (2013.01); *G06F 2209/5017* (2013.01); *G06F 2209/5022* (2013.01)

(58) Field of Classification Search
CPC .................................. G06F 9/505; G06F 9/52
USPC ................................................. 718/105, 106
See application file for complete search history.

(56) References Cited

U.S. PATENT DOCUMENTS

| | | | |
|---|---|---|---|
| 6,148,324 A * | 11/2000 | Ransom et al. | 718/105 |
| 7,137,116 B2 * | 11/2006 | Parkes et al. | 718/102 |
| 7,502,888 B2 * | 3/2009 | Fowles | 711/130 |
| 8,213,518 B1 * | 7/2012 | Wang et al. | 375/240.25 |
| 2009/0077561 A1 * | 3/2009 | Feng et al. | 718/104 |
| 2010/0235845 A1 | 9/2010 | Bates et al. | |
| 2011/0078691 A1 | 3/2011 | Yildiz et al. | |

(Continued)

FOREIGN PATENT DOCUMENTS

| | | |
|---|---|---|
| JP | 8-44577 A | 2/1996 |
| RU | 2153699 C1 | 7/2000 |

OTHER PUBLICATIONS

International Search Report and Written Opinion received for PCT application No. PCT/IB2011/001823, mailed on Mar. 15, 2012, 7 Pages.

(Continued)

*Primary Examiner* — Andy Ho
(74) *Attorney, Agent, or Firm* — Grossman, Tucker, Perreault & Pfleger, PLLC (57) ABSTRACT

A method according to one embodiment includes the operations of loading binary code comprising a top level task into memory on a first processor, the top level task having an associated range; determining if the top level task is divisible into a plurality of sub-tasks based on the range; for each of the sub-tasks, determining if a given sub-task is divisible into a plurality of sub-sub-tasks; and if the given sub-task is indivisible, executing the given sub-task; otherwise, if the given sub-task is divisible, dividing the given sub-task into the plurality of sub-sub-tasks.

20 Claims, 4 Drawing Sheets

(56) References Cited

U.S. PATENT DOCUMENTS

2011/0119469 A1* 5/2011 Ohmacht .................. 712/216
2014/0165077 A1* 6/2014 Martinez Canedo et al. . 718/105

OTHER PUBLICATIONS

Tzannes et al., "Lazy Binary Splitting: A Run-rime Adaptive Dynamic Work-Stealing Scheduler". Proc. 15th ACM Symposium on Principles and Practice of Parallel Programming, Jan. 9-14, 2010.

Faxen, "Wool-A work STealing Library", SIGARCH Computer Architecture News, 2008.

Robinson et al., "Optimization via Reflection on Work Stealing in TBB", IEEE International Symposium on Parallel and Distributed Processing, 2008.

Intel C++ Compiler 12.0 User and References Guides, Intel Cilk Plus Language Features; Document No. 304968-022US.

Malakhov, "Reactive recursive binary splitting for TBB", Optimization Note, Intel Corporation.

* cited by examiner

METHOD AND SYSTEM FOR WORK PARTITIONING BETWEEN PROCESSORS WITH WORK DEMAND FEEDBACK

CROSS-REFERENCE TO RELATED APPLICATIONS

This application is a U.S. national stage completion of International Application No. PCT/IB2011/001823 filed Aug. 5, 2011, the entire content of which is herein incorporated by reference.

FIELD

The present disclosure relates to work partitioning, and more particularly, to work partitioning with work demand feedback.

BACKGROUND

On computer systems with multiple processors, parallel processing may enable a reduction in the time required to perform a task by distributing the workload associated with that task among the processors. In programs that utilize loop-based or recursive parallelism to increase performance in this manner, there exists a conflict between the need to decrease overhead associated with work decomposition and distribution across multiple processors, versus the desire to increase potential parallelism for improved load balancing and utilization of the processors. This conflict is often resolved by selection of a grain size, which is a lower bound on the amount of work that could benefit from parallelism. The grain size is a cut-off point that limits the number of sub-divisions that will be applied to a task.

There are a number of limitations to this approach, however. It may be difficult to choose an appropriate grain size, and the optimal level of granularity may vary between tasks and even within a given task. If workload is misbalanced across a task, a small grain size that may be efficient for sub-tasks with significant work can cause excessive overhead for other sub-tasks with less work. Alternatively, larger grain sizes suitable for sub-tasks with lighter workloads can result in overloading of the sub-tasks with greater workloads, load imbalance and underutilization of processing resources.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

1. Introduction

Generally, this disclosure provides methods and systems for run-time load balancing of a task among multiple processors based on recursive task partitioning and processor utilization feedback. A task may be defined as any type of work that needs to be done, which is accomplished through the execution of one or more instructions on a processor, applied to associated data. A task may comprise user-provided code or internal code or a combination of the two. Some, but not all, types of tasks are capable of being divided into sub-tasks, each of which may be executed in parallel on different processors. This can result in a performance improvement since the work will generally be completed more quickly as a result of the parallel execution of each sub-task. The actual performance improvement will be limited to some extent, however, due to overhead associated with, for example, partitioning the task, performing inter-processor communication and synchronization, and re-assembling the partial results of each sub-task into an overall result.

The process of dividing work into sub-tasks may be repeated, at a next lower level of sub-division, as sub-tasks can be further divided into smaller sub-sub-tasks, etc.

Theoretically, this process of task sub-division can be repeated down through subsequent lower levels indefinitely. The advantage of sub-dividing a task into a large number of ever-smaller sub-sub-tasks is that these sub-sub-tasks can be distributed more evenly over a large number of processors for execution in parallel with one another, providing an overall increase in performance due to load balancing. There are limits, however, to the level of sub-division that may actually be achieved. First, there will eventually be a point where a sub-sub-task is indivisible due to its small size and/or the fact that its components instructions must be executed serially. Second, as sub-sub-tasks become smaller, the amount of useful work they perform (the work that, by definition, the task was meant to perform) may decrease while the overhead associated with the sub-sub-task may remain substantially constant, i.e., independent of the size of the sub-sub-task. Thus, at some point, there is no efficiency to be gained from further sub-divisions and, in fact, performance may be degraded since more processing time is devoted to overhead than to useful work. Third, there are a finite number of processors over which the sub-sub-tasks may be distributed, so at some point further sub-divisions cease to increase the amount of parallel execution that can be performed.

The repetitive process of dividing tasks into sub-tasks, also called recursive decomposition, will be described in greater detail below. One example of recursion is a technique where a unit of executable code, for example, a subroutine, calls itself. Recursive decomposition may be accomplished by a subroutine applied to a task to create smaller sub-tasks. Each invocation of the decomposition subroutine creates a new level or depth of recursion. This could result in an infinite loop if not for the existence of a conditional test in the subroutine, which, when met, prevents the invocation of further levels of decomposition. The termination condition may be that the sub-sub-task is no longer divisible or that the recursion level has exceeded a depth threshold.

2. Definitions

A task may be defined as any type of work that needs to be done with associated data, which is accomplished through the execution of one or more instructions on a processor. A task may comprise user-provided code and data or internal code and data or a combination of the two. A task may create other tasks during its execution, for example it may be divided into sub-tasks and sub-tasks may be further subdivided into sub-sub-tasks etc.

Spawning refers to an offer, by a first processor, of a task for execution on another processor. Spawning may put the task into a local task pool associated with the first processor or with another processor, or into a global task pool.

The term range may be defined as a user provided descriptor of the work, which specifies whether the work is divisible and, if so, how it may be divided. For example, a top level range may simply be 1-100 which is divisible into ranges 1-50 and 51-100.

A range pool is a storage area in memory for holding ranges. A range pool associated with a task running on any given processor is private to that processor.

A recursion depth is the level of recursion that is reached after some number of sub-divisions or splits. It may be specified in relative or absolute terms. For example, an absolute depth may begin the level counting from the first top level range describing the entire scope of work to be done, and increase in a continuous manner with each recursive split. A relative depth may begin the level counting from the first level range within a sub-task, for example when the range pool is used to store multiple ranges for one task.

A maximum recursion depth or recursion depth threshold ($RD_{TH}$) is a limit on further recursive range splitting when the current recursion depth (CRD) exceeds the threshold.

The term demand refers to an indication that another processor may be available to execute a task. This information can be provided by means of a signaling task, inspection of a task pool, or a global flag or counter.

A signaling task may be an ordinary sub-task with an associated range to process; but being executed on a second processor it also provides a feedback to the processor which originated this signaling task.

3. Embodiments

Embodiments of the present disclosure provide the ability to partition and schedule tasks dynamically and automatically to increase performance in a multiprocessing environment by providing better load balancing and lower overhead associated with work decomposition between tasks.

Load balancing is the distribution of tasks across multiple processors to improve utilization of the processors. As described previously, there is a conflict between the overhead associated with task sub-division and distribution across multiple processors, and the desire to improve load balancing by increasing parallelism. One approach to resolving this conflict is to select a grain size, prior to run-time, which is cut-off point or lower bound that limits the number of sub-divisions that will be applied to a task. It is difficult, however, to choose a suitable grain size since the optimal level of granularity may vary from one task to the next and may change within a given task, i.e., from one sub-task to the next during run-time. A fixed, pre-chosen grain size may result in some sub-tasks being overloaded while other sub-tasks are subject to excessive overhead, resulting in an underutilization or waste of processing resources.

Embodiments of the present disclosure enable run-time load balancing of a task among multiple processors based on recursive task partitioning, eliminating creation of excessive tasks and the requirement for a fixed, pre-chosen grain size. The initial invocation of the load balancer, at the top level of recursion, operates on the task and may sub-divide the task into two or more sub-tasks, if possible. Each of the sub-tasks may then be passed on to new recursive invocations of the load balancer. These new invocations of the load balancer may be executed on other processors depending on availability. This recursive process may be repeated to lower levels of recursion until a termination condition is met. The termination condition may be that the sub-sub-task is no longer divisible or that the recursion level has exceeded a depth threshold. The depth threshold may be dynamically adjustable based on the changing availability of processors.

Figure 1:
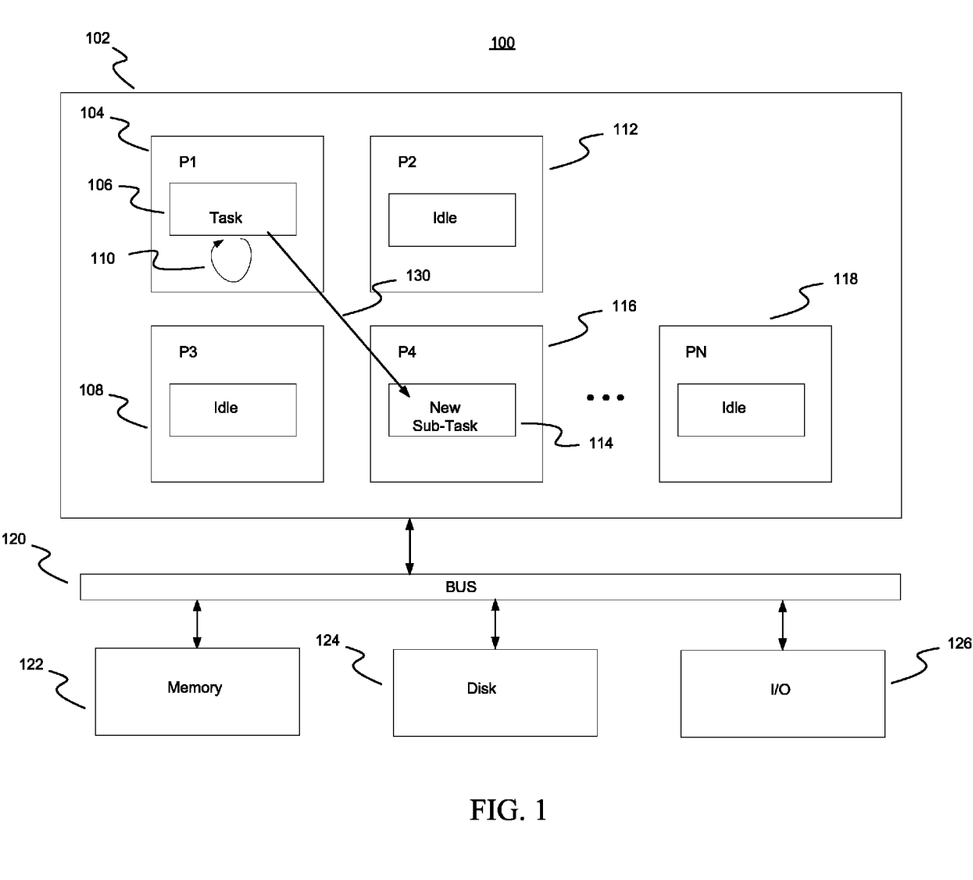
FIG. 1 illustrates a system hardware block diagram of one exemplary embodiment consistent with the present disclosure.

FIG. 1 illustrates at a high level a system hardware block diagram 100 of one exemplary embodiment consistent with the present disclosure. System 100 may comprise a number of processors: P1 104, P2 112, P3 108, P4 116, ... PN 118. These processors may be separate processing units or they may be part of a multiprocessor core 102. Each processor may comprise local memory, which may be private to that processor. A shared memory 122, disk storage 124 and input/output (I/O) facilities 126 may also be provided and accessed through one or more buses 120. In some embodiments, processor P1 104 may be configured to perform the load balancing operation on a task 106. Processor P1 104 may sub-divide 110 task 106 into new sub-tasks to be executed on processor P1 104. Processor P1 104 may also spawn 130 part of the work associated with task 106 into new sub-tasks such as 114 for execution on another processor, for example P4 116. Spawning may be based, at least in part, on processor availability, which may be in the form of a demand for work to be described more fully below.

Figure 2:
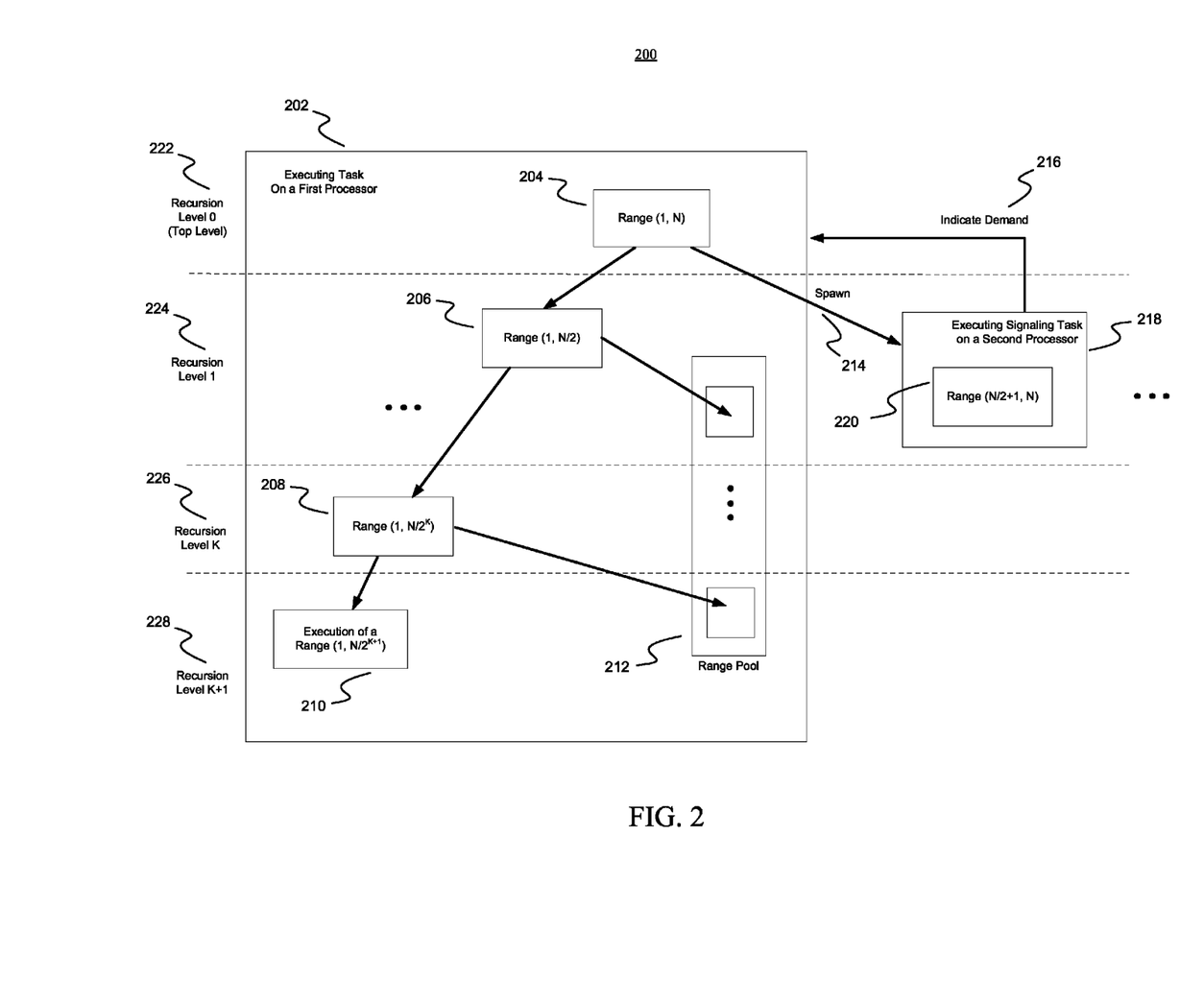
FIG. 2 illustrates a system logic block diagram of one exemplary embodiment consistent with the present disclosure.

FIG. 2 illustrates a system logic block diagram 200 of one exemplary embodiment consistent with the present disclosure. In some embodiments, there may be an initial stage in the process, not shown here for simplicity, where a top level task is divided (if possible) among a number of available processors. Block 202 shows the execution, on a first processor, of either the entire top level task or of one of the sub-divided tasks, which has been assigned to the first processor. This first level of execution 222 may be considered recursion level 0, when specified as relative depth. A range 204 is associated with this top level task. Range 204 is provided as a descriptor of a subset of the work and, at this level of the recursion, identifies N potential work items (1 through N).

Range 204 is recursively split into sub-ranges, here 206 and 220, at the next lower recursion level 224. Splitting need not be limited to binary splitting, as in this example, but may in some embodiments, comprise multi-way splitting ranging from 2 to N. Each sub-range covers one half of the N work items. Sub-range 206 covers items 1 through N/2 while sub-range 220 covers items N/2+1 through N. A new signaling task comprising sub-range 220 may be created and spawned 214. If another processor 218 is idle, it may acquire the signaling task and execute it. During execution, the signaling task may indicate a demand for work 216, and may process the sub-range 220 in the same manner as processor 202 does for the range 204, as described below. Although not shown in this figure, any number of additional processors may be available for processing new signaling tasks that may be created at each of the levels of recursion 222, 224, 226 in response to previously indicated demand. Otherwise, if an idle processor is not available, sub-range 220 may be later processed by the first processor 202, without indicating a demand.

Range pool 212 may be private to processor 202 and not visible to other processors. Sub-range 206 may be further recursively subdivided into smaller sub-ranges 208 at lower recursion levels 226 with one half of each subdivision being stored in range pool 212. At the lowest recursion level 228, when the sub-range 210 can no longer be subdivided, or the recursion depth has exceeded a threshold, or range pool 212 has exceeded its capacity, the work associated with that sub-range 210 is executed. Other sub-ranges stored in the range pool 212 will be further split and executed in the same manner unless the work demand 216 is indicated.

If the demand 216 is indicated, a new signaling task may be created for a range from the range pool 212, typically with the topmost recursion level available. This range is excluded from the range pool after the task is created and offered for execution by other processors in a manner similar to 214.

The recursion depth threshold, which determines the limit of recursion depth, may be adjusted dynamically in response to a number of different situations. It can be adjusted in a currently executing task on a given processor 202 in response to receiving demand feedback 216 from another processor 218. The threshold can also be adjusted in the signaling task as a result of being executed by the second processor 218, as explained below. Additionally, the threshold can be adjusted in a task which is created as a result of demand feedback. The threshold adjustment may be an increase in the value of the threshold by any suitable amount.

Figure 3:
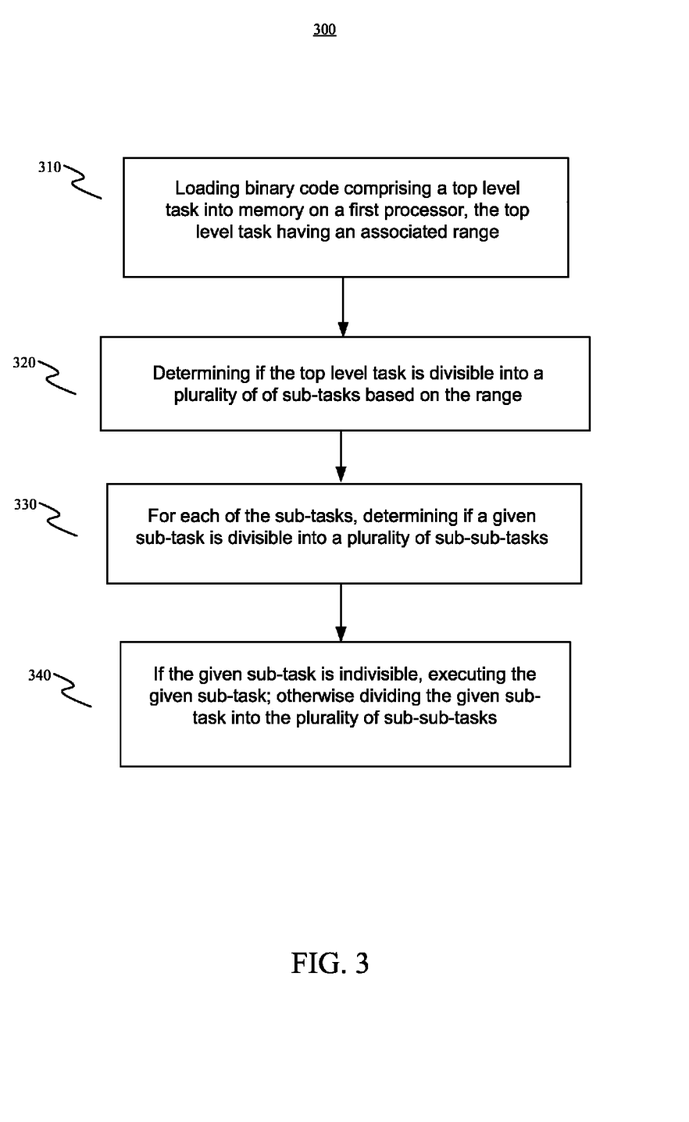
FIG. 3 illustrates a flowchart of operations of one exemplary embodiment consistent with the present disclosure.

FIG. 3 illustrates a flowchart 300 of operations of one exemplary embodiment consistent with the present disclosure. At operation 310, binary code comprising a top level task is loaded into memory on a first processor. The top level task has an associated range which describes how the task may be subdivided, if subdivision is possible. At operation 320, a determination is made as to whether the task is divisible into a plurality of sub-tasks based on the range. At operation 330, for each of the sub-tasks, a determination is made as to whether the given sub-task is divisible into a plurality of sub-sub-tasks. At operation 340, if the given sub-task is not divisible then it is executed, otherwise it is divided into a plurality of sub-sub-tasks. In some embodiments a determination is made as to whether a second processor has a demand for work and, if so, one or more of the plurality of sub-tasks is executed on the second processor in response to that demand. The determination of work demand on other processors may be accomplished by spawning a signaling task that sets a flag indicating a demand for work if that signaling task is executed by another processor. In some embodiments the signaling task may terminate after setting the flag. In other embodiments the signaling task may also comprise the sub-task to be executed and the signaling task will remain active to execute that sub-task. When the signaling task also executes the sub-task, the recursion depth threshold may need to be adjusted to avoid excessive recursion.

A dynamically adjusted recursion depth threshold may determine both the granularity of the work and the frequency of tests for processor work demand. A larger threshold results in deeper levels of recursion producing smaller ranges. The process may work on coarse slices (large sub-task granularity) during the initial stages, but as the threshold is increased in response to detected demand from other processors, the granularity is reduced and work is shared with idle processors. This dynamic granularity adjustment enables both reduced overhead and increased utilization in response to a variety of types of tasks. The recursion depth threshold does not require prior knowledge of the characteristics or nature of the task or the underlying problem that the task is meant to solve. In some embodiments, the recursion depth threshold is initially set to $\log_2(P*U*V)$, where P represents the total number of available processors, U represents the number of sub-tasks initially created per processor, and V represents a desired number of processor demand checks to be performed per sub-task. In some embodiments, U and V may be chosen to be 4, 8, 16 or 32 and may be fine tuned based on operational experience.

Figure 4:
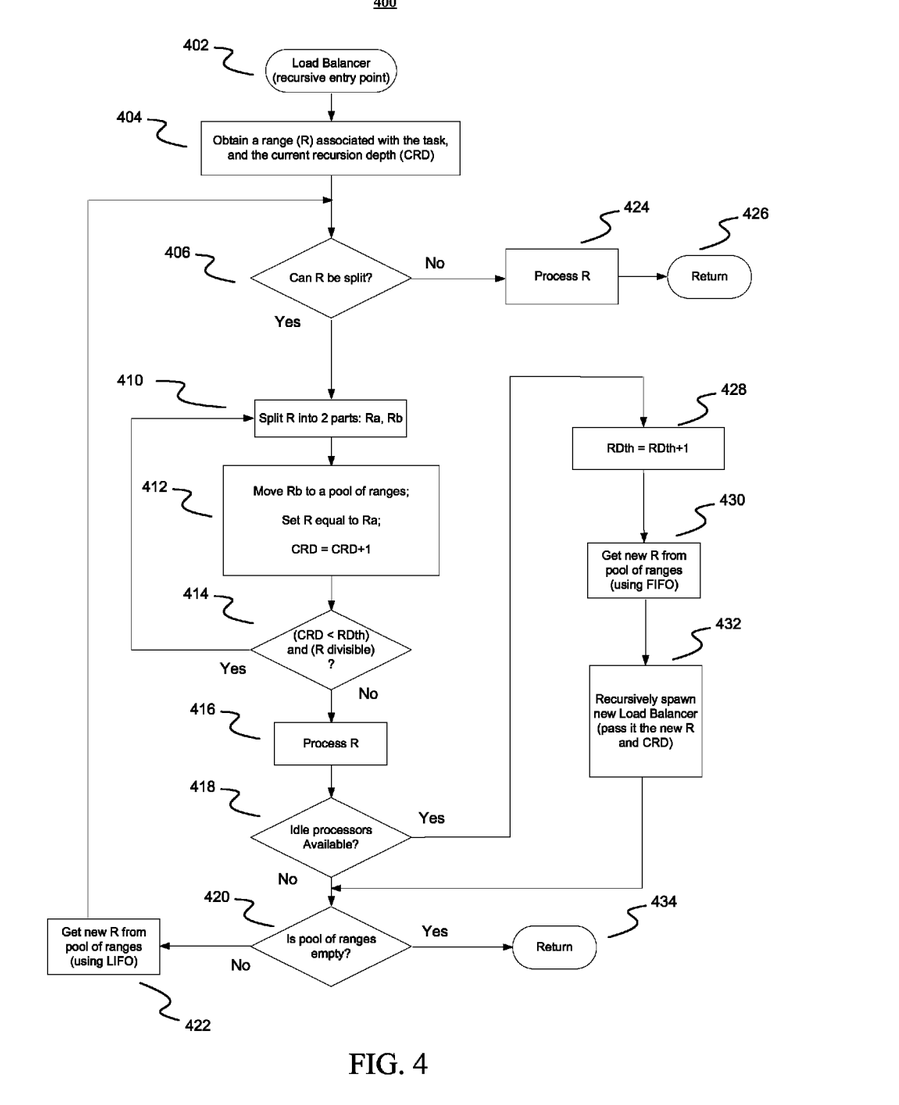
FIG. 4 illustrates a flowchart of operations of one exemplary embodiment consistent with the present disclosure.

FIG. 4 illustrates a flowchart 400 of operations of one exemplary embodiment consistent with the present disclosure. At operation 402, a recursive entry point is provided for the load balancer. At operation 404, a range (R) associated with the current task is obtained. A current recursion depth (CRD) is also obtained. Depending on the level of recursion (CRD), the current task may be a top level task or a sub-task. At operation 406, it is determined whether R can be split or sub-divided. At operation 424, where R is indivisible, then R is processed and the work associated with R is executed. At operation 426, then, the current task finishes its execution.

At operation 410, where R is divisible, R is subdivided into two parts: $R_A$ and $R_B$. At operation 412, $R_B$ is moved to, or stored, in a pool of ranges. The pool may be storage that is private to the current task. R is then made equal to $R_A$, and CRD is incremented. At operation 414, a condition is determined that CRD is less than a recursion depth threshold ($RD_{TH}$) and that R is divisible. If the condition is true, the method loops back to operation 410. If the condition is not true, then at operation 416, R is processed and the task associated with R is executed. At operation 418, it is determined whether any other idle processors are available. If an idle processor is not available, the process continues at operation 420. If an idle processor is available (or demanding work), then at operation 428, the $RD_{TH}$ is incremented. At operation 430, a new R is fetched from the pool of ranges. In some embodiments, the fetch is performed on a First-In-First-Out (FIFO) basis. At operation 432, a new load balancer is spawned to be available for execution on idle processors, with the new R and the current recursion depth (CRD). The process then continues at operation 420, where it is determined whether the pool of ranges is empty. If the pool is empty, then, at operation 434, the current task finishes. If the current task is the last task, then the process is completed. If the pool is not empty, then, at operation 422, a new R is fetched from the pool of ranges. In some embodiments, the fetch is performed on a Last-In-First-Out (LIFO) basis. The method then loops back to operation 406.

In some embodiments, as an alternative to the range pool, there may be a grouping of spawned sub-tasks in a local task pool of one processor. These spawned tasks may be counted in a group object that may comprise a reference counter and a recursion depth threshold. If a task is stolen from the group by another processor, the recursion depth threshold may be increased for the whole group, thus affecting the remaining tasks in the group, and a new group may be created on the other processor based on the stolen task. When a task starts, the recursion depth is checked against the threshold and further task splitting is performed, if possible, or the task is executed.

In some embodiments, recursive depth thresholds and the associated testing may be eliminated for simplicity of operation at the expense of less adaptive or reduced granularity of the work. In this case recursion ends when sub-tasks are no longer divisible.

The following is an illustrative example of one embodiment of a pseudo code consistent with the present disclosure. Lines 1-12 of the pseudo code are operable to define a flag class for synchronization between tasks. Lines 14-21 are operable to define a structure that combines a range and a recursion depth. The recursive load balancer task begins at line 23. Lines 25-28 are operable to process a range immediately if the range is indivisible. Lines 31-36 are operable to create a flag and a signaling task to communicate work demand between processors. Line 40 is operable to set a recursion depth threshold. Lines 43-45 are operable to create a private range pool and a range associated with the current recursion depth. Lines 46-86 are operable to implement the main processing loop of the recursive load balancer task.

Lines 52-56 are operable to recursively split the current range into two sub-ranges, store one sub-range in the private range pool and repeat with the other sub-range until the range is indivisible or the recursion depth threshold is exceeded. Line 60 is operable to process the current range. Lines 63-70 are operable to recursively spawn a new load balancer task on another processor, if that processor has made a demand for work, and provide that new task with a range from private range pool taken in a FIFO order. Lines 71-78 are operable to reset the work demand signaling mechanism and increment the depth threshold. Lines 81-83 are operable to take a range from the private pool in a LIFO order and repeat the loop. Lines 90-95 are operable to implement the work demand signaling mechanism.

```
1    // The flag class for task synchronization.
2    class flag_t {
3    public:
4        flag_t( bool );
5        void set_reference_count( int );         // for lifetime management
6        static void dereference( flag_t* );      // destroy flag if its reference count goes to 0
7        // methods to operate with the flag
8        void set( );
9        void reset( );
10       bool is_set( );
11       // additional methods
12   };
13
14   // The structure that combines a range and a depth value.
15   template<class Range>
16   struct range_and_depth {
17       Range range;
18       depth_t depth;
19       range_and_depth( Range r, depth_t d ) : range(r), depth(d) { }
20       // additional methods
21   };
22
23   // The main part of implementation: code of the load-balancing tasks
24   void load_balance_task<Range>::execute( Range my_range, depth_t my_depth ) {
25       // If the range cannot be split, process it immediately.
26       if( !my_range.is_divisible( ) ) {
27           user_function( my_range );
28           return;
29       }
30
31       // Create a flag to communicate work demand; initially set to "no demand".
32       flag_t* work_demand = new flag_t( false );
33       work_demand->set_reference_count( 2 );
34
35       // Spawn a signal task that, if executed by another thread, will set the flag.
36       spawn( new signal_task( work_demand ) );
37
38       // Set the threshold K levels "deeper" than my_depth,
39       // to split my_range into at least 2^K pieces.
40       depth_t depth_threshold = my_depth + K;
41
42       // The container for ranges and associated depth values.
43       typedef range_and_depth<Range> RnD;
44       vector<RnD> range_pool;
45       RnD current_rnd(my_range, my_depth);
46       for(;;) {
47           /* Starting from the given (current) range, split it recursively
48           into two sub-ranges. Put one half into a private pool of ranges,
49           and repeat with the other one until either it cannot be split
50           or recursion depth reaches the threshold.
51           */
52           while( current_rnd.depth < depth_threshold && current_rnd.range.is_divisible( ) ) {
53               // The Range splitting constructor updates its input range to become
54               // the "left" half of itself. New object is the "right" half.
55               range_pool.push_back( RnD( Range(current_rnd.range, split( )),
56               ++current_rnd.depth ) );
57           }
58
59           // Apply the user function to the range.
60           user_function( current_rnd.range );
61
62           // Test the demand flag. If there is no demand, go to line 80.
63           if( work_demand->is_set( ) ) {
64               if( range_pool.size( ) > 1 ) {
65                   // Take the range from the beginning of the private pool, i.e.
66                   // in FIFO order. Spawn a new task to process this range.
67                   spawn( new load_balance_task( range_pool.front( ).range,
68                   range_pool.front( ).depth ) );
69                   range_pool.pop_front( );
70               }
```

```
71              // Reset the flag to "no demand".
72              work_demand->reset( );
73              work_demand->set_reference_count( 2 );
74
75              // Spawn another signal task for demand detection.
76              spawn( new signal_task( work_demand ) );
77              // Increment the recursion depth threshold.
78              ++depth_threshold;
79          }
80          // Take the range at the end of the private pool, i.e. in LIFO order.
81          if( range_pool.empty( ) ) break;
82          current_rnd = range_pool.back( );
83          range_pool.pop_back( );
84
85          // Repeat from line 46 above, until the pool is empty
86      }// for(;;)
87      dereference( work_demand );
88  }
89
90  // Code of the signal task
91  signal_task::execute( flag_t* work_demand ) {
92      if( is_stolen_task( ) )
93          work_demand->set( );
94      dereference( work_demand );
95  }
```

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. Although some claim elements may be labeled for clarity, it will be appreciated that in some implementations, the order of performance of the claim elements may be varied.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method, comprising:
loading binary code comprising a top level task into memory on a first processor, said top level task having an associated range;
determining if said top level task is divisible into a plurality of sub-tasks based on said range;
for each of said sub-tasks, determining if a given sub-task is divisible into a plurality of sub-sub-tasks; and
if said given sub-task is indivisible, executing said given sub-task; if said given sub-task is divisible, dividing said given sub-task into said plurality of sub-sub-tasks.

2. The method of claim 1, further comprising determining if a second processor has a demand for work.

3. The method of claim 2, further comprising executing one or more of said plurality of sub-tasks on said second processor in response to said demand for work.

4. The method of claim 2, wherein said determining that said second processor has a demand for work is performed by spawning a signal task, wherein said signal task sets a flag indicating said demand for work if said signal task is stolen by said second processor.

5. The method of claim 1, wherein said sub-sub-tasks are further divided until a sub-division threshold is exceeded.

6. The method of claim 5, wherein said sub-division threshold is initially set to $\log_2(P*U*V)$, where P represents a total number of available processors, U represents an initial number of sub-tasks created on each of said available processors, and V represents a number of checks for processor work demand performed by each of said sub-tasks.

7. The method of claim 6, wherein said sub-division threshold is dynamically adjusted based on processor availability.

8. A non-transitory computer-readable storage medium having instructions stored thereon which when executed by a processor result in the following operations comprising:
- loading binary code comprising a top level task into memory on a first processor, said top level task having an associated range;
- determining if said top level task is divisible into a plurality of sub-tasks based on said range;
- for each of said sub-tasks, determining if a given sub-task is divisible into a plurality of sub-sub-tasks; and
- if said given sub-task is indivisible, executing said given sub-task; if said given sub-task is divisible, dividing said given sub-task into said plurality of sub-sub-tasks.

9. The non-transitory computer-readable storage medium of claim 8, further comprising determining if a second processor has a demand for work.

10. The non-transitory computer-readable storage medium of claim 9, further comprising executing one or more of said plurality of sub-tasks on said second processor in response to said demand for work.

11. The non-transitory computer-readable storage medium of claim 9, wherein said determining that said second processor has a demand for work is performed by spawning a signal task, wherein said signal task sets a flag indicating said demand for work if said signal task is stolen by said second processor.

12. The non-transitory computer-readable storage medium of claim 8, wherein said sub-sub-tasks are further divided until a sub-division threshold is exceeded.

13. The non-transitory computer-readable storage medium of claim 12, wherein said sub-division threshold is initially set to $\log_2(P*U*V)$, where P represents a total number of available processors, U represents an initial number of sub-tasks created on each of said available processors, and V represents a number of checks for processor work demand performed by each of said sub-tasks.

14. The non-transitory computer-readable storage medium of claim 13, wherein said sub-division threshold is dynamically adjusted based on processor availability.

15. A system, comprising:
a plurality of processors;
a memory configured to host load balancer code to be executed on said plurality of processors, wherein when said load balancer code is executed on said processors said load balancer code causes said processors to:
load binary code comprising a top level task into memory on a first processor, said top level task having an associated range;
determine if said top level task is divisible into a plurality of sub-tasks based on said range;
for each of said sub-tasks, determine if a given sub-task is divisible into a plurality of sub-sub-tasks; and
if said given sub-task is indivisible, execute said given sub-task; if said given sub-task is divisible, divide said given sub-task into said plurality of sub-sub-tasks.

16. The system of claim 15, wherein said load balancer code further causes said processors to determine if a second processor has a demand for work.

17. The system of claim 16, wherein said load balancer code further causes said processors to execute one or more of said plurality of sub-tasks on said second processor in response to said demand for work.

18. The system of claim 16, wherein said load balancer code further causes said processors to spawn a signal task, wherein said signal task sets a flag indicating said demand for work if said signal task is stolen by said second processor.

19. The system of claim 15, wherein said load balancer code further causes said processors to further divide said sub-sub-tasks until a sub-division threshold is exceeded.

20. The system of claim 19, wherein said sub-division threshold is initially set to $\log_2(P*U*V)$, where P represents a total number of available processors, U represents an initial number of sub-tasks created on each of said available processors, and V represents a number of checks for processor work demand performed by each of said sub-tasks.

* * * * *